United States Patent
Zuteck

(10) Patent No.: US 8,079,819 B2
(45) Date of Patent: Dec. 20, 2011

(54) OPTIMIZATION OF PREMIUM FIBER MATERIAL USAGE IN WIND TURBINE SPARS

(76) Inventor: Michael D. Zuteck, Clear Lake Shores, TX (US)

( * ) Notice: Subject to any disclaimer, the term of this patent is extended or adjusted under 35 U.S.C. 154(b) by 400 days.

(21) Appl. No.: 12/470,435

(22) Filed: May 21, 2009

(65) Prior Publication Data

US 2010/0296941 A1 Nov. 25, 2010

(51) Int. Cl.
*F01D 5/18* (2006.01)

(52) U.S. Cl. ..... 416/226; 416/228; 416/230; 416/241 A; 416/241 R

(58) Field of Classification Search ............... 416/223 R, 416/225, 226, 229 R, 233, 241 R
See application file for complete search history.

(56) References Cited

U.S. PATENT DOCUMENTS

| | | | |
|---|---|---|---|
| 5,499,904 A * | 3/1996 | Wallace et al. | 416/230 |
| 7,427,189 B2 * | 9/2008 | Eyb | 416/226 |
| 7,942,637 B2 * | 5/2011 | Akhtar et al. | 416/226 |
| 2009/0140527 A1 * | 6/2009 | Pawar et al. | 290/55 |
| 2010/0047074 A1 * | 2/2010 | Hernandez et al. | 416/230 |
| 2010/0068065 A1 * | 3/2010 | Jensen | 416/241 R |
| 2010/0092300 A1 * | 4/2010 | Jensen et al. | 416/233 |
| 2010/0104447 A1 * | 4/2010 | Eyb | 416/230 |
| 2010/0135818 A1 * | 6/2010 | Babu et al. | 416/226 |
| 2010/0143142 A1 * | 6/2010 | Akhtar | 416/226 |
| 2010/0143146 A1 * | 6/2010 | Bell et al. | 416/233 |
| 2010/0296941 A1 * | 11/2010 | Zuteck | 416/226 |
| 2011/0052407 A1 * | 3/2011 | Zuteck | 416/241 R |
| 2011/0052408 A1 * | 3/2011 | Zuteck | 416/241 R |
| 2011/0142662 A1 * | 6/2011 | Fritz et al. | 416/226 |
| 2011/0142669 A1 * | 6/2011 | Althoff et al. | 416/229 R |
| 2011/0243750 A1 * | 10/2011 | Gruhn et al. | 416/226 |
| 2011/0243751 A1 * | 10/2011 | Fritz et al. | 416/241 R |

* cited by examiner

*Primary Examiner* — Michael Lebentritt
(74) *Attorney, Agent, or Firm* — David McEwing

(57) ABSTRACT

The use of premium material in the construction of wind turbine blades may provide increases in blade efficiency and enable the use of thinner blades. By providing a spar cap having a section of premium material having a constant thickness, the use of the premium material may be optimized to provide a more effective use of premium material. Additional material, which may be less expensive as well as heavier, may be added near the blade root to provide additional strength and stiffness to the blade.

19 Claims, 3 Drawing Sheets

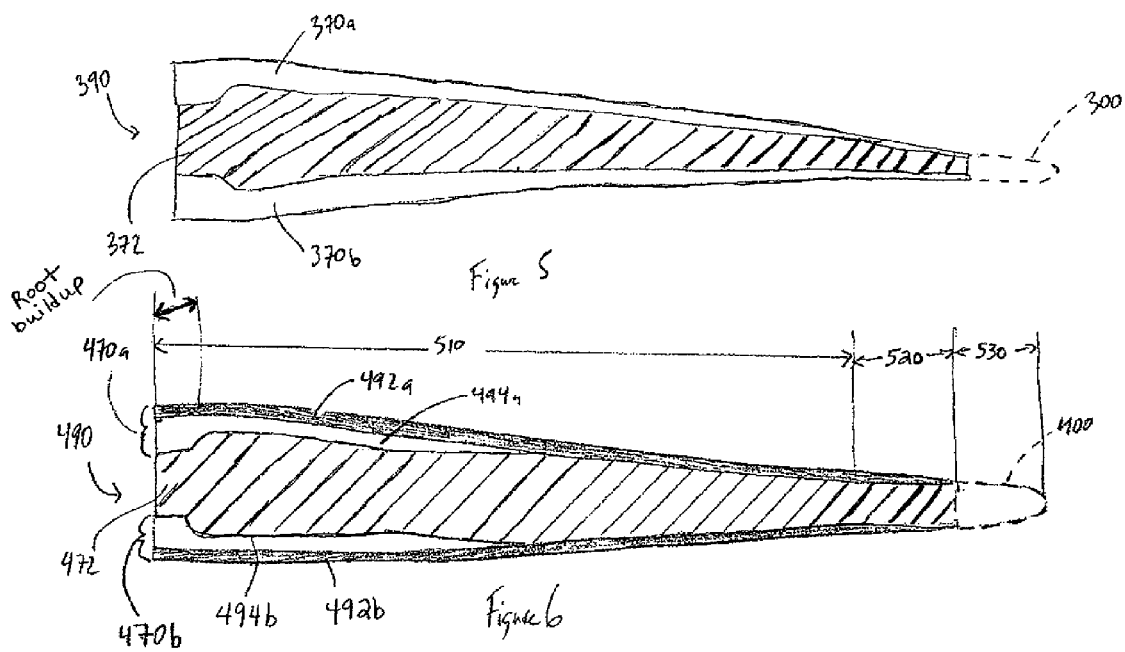
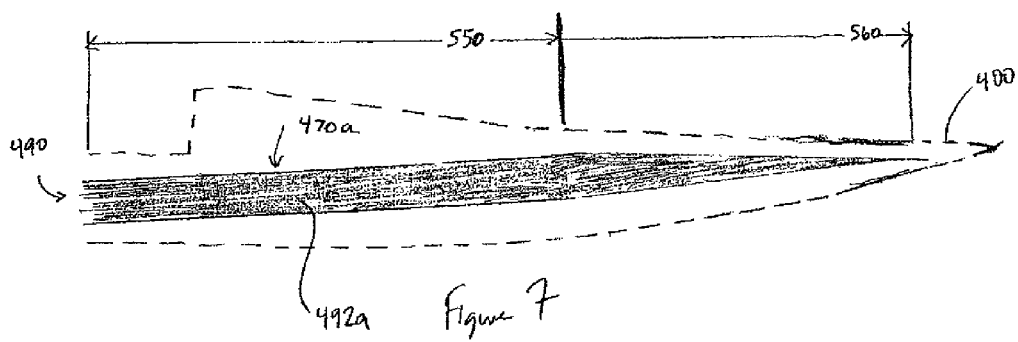

OPTIMIZATION OF PREMIUM FIBER MATERIAL USAGE IN WIND TURBINE SPARS

BACKGROUND OF THE INVENTION

1. Field of the Invention

The invention is directed generally to wind turbine blade design.

2. Description of the Related Art

Wind turbine blades are comprised of shells and other structural components which may be thickest near the base, or root, of the blade. The weight of these components in regions near the midpoint of the blade and beyond becomes a key factor in reducing blade deadweight moment, while the weight of such components near the blade root is comparatively less important. The use of premium materials, which have a high stiffness or strength to weight ratio, may enable the weight of these components to be reduced, and may significantly improve blade properties. However, these premium materials may be more expensive than other materials. Optimization of the use of such premium materials may provide significant cost savings, as well as better mechanical performance.

Use of premium material only in the outer blade is possible by means of a material transition zone joining plies of premium fiber to other material. Such a material transition zone is difficult to build into the limited internal volume of the outboard blade sections, due to extra thickness needed in the material overlap region to transition working strains and overcome stress raisers from starting and ending material layers.

SUMMARY OF THE INVENTION

In one aspect, a wind turbine blade is provided, including a blade shell, and a main spar located at least partially within the blade shell, the main spar including a first spar cap, a second spar cap, and at least one shear web extending between the first spar cap and the second spar cap, where the first spar cap includes a first component including a first material, where the first component has a substantially constant thickness over a section of the spar cap which extends along at least half the length of the blade shell, and a second component located adjacent the first component and including a second material, where the second material is different from the first material.

In another aspect, a wind turbine blade is provided, including a blade shell, and a main spar located at least partially within the blade shell, the main spar including a first spar cap, a second spar cap, and at least one shear web extending between the first spar cap and the second spar cap, where the first spar cap includes a first component including a first material and a second component including a second material, the second material being different than the first material, where the first component includes a plurality of plies of the first material extending at least between a first point in an inboard region of the blade and a second point located more than 50% of the blade length away from the first point.

In another aspect, a spar is provided, including a first spar cap, where the first spar cap includes a first component including a constant thickness section having a substantially constant thickness of a first material, and a second component having thickness which varies over the length of the second component, where the length of the substantially constant thickness section of the first component is greater than the length of the second component, a second spar cap, and at least one shear web extending between an inner surface of the first spar cap and an inner surface of the second spar cap.

BRIEF DESCRIPTION OF THE DRAWINGS

FIG. 5 is a side view of an exemplary spar structure wherein the spar caps are formed primarily from a single type of material.

FIG. 6 is a side view of an another exemplary spar structure wherein the spar caps are formed of a mixture of a premium material and an additional material.

FIG. 7 is a top view of the exemplary spar structure of FIG. 5,

DETAILED DESCRIPTION OF THE PREFERRED EMBODIMENT

Figure 1:
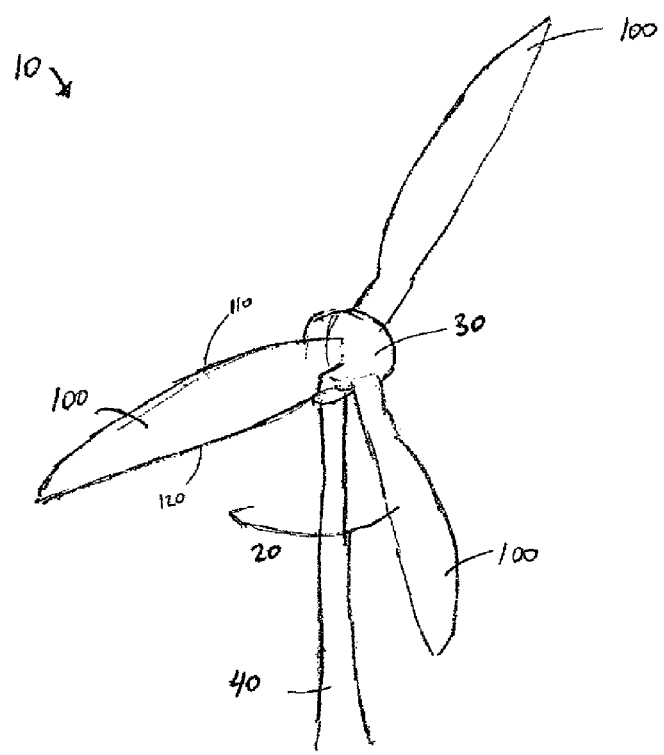
FIG. 1 is a perspective view of a wind turbine comprising three wind turbine blades.

FIG. 1 depicts an exemplary wind turbine 10 comprising three wind turbine blades 100 extending radially from a wind turbine hub 30 mounted on a tower 40. The wind turbine rotates in a direction 20, such that a leading edge 110 of a blade 100 and a trailing edge 120 are oriented as shown in FIG. 1.

Figure 2:
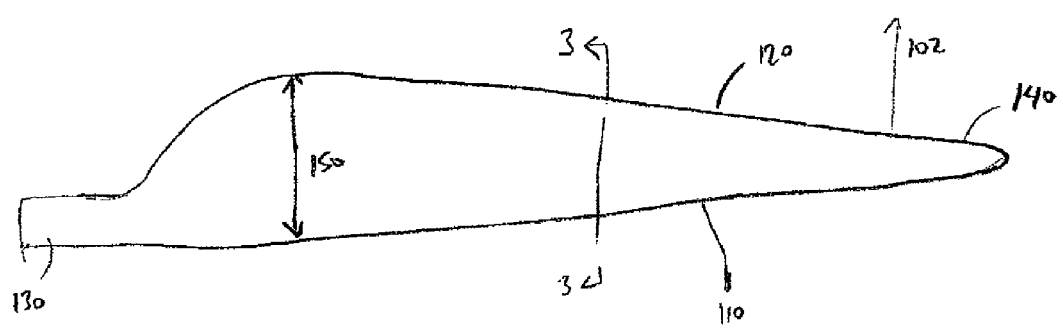
FIG. 2 is a top plan view of a wind turbine blade.

FIG. 2 is a top plan view of an exemplary wind turbine blade 100 of FIG. 1. The chord length of the blade is measured from the leading edge 110 to the trailing edge 120 within a twisting plane whose outer part lies near the plane of rotation of the blade 100 in its full power setting. This chord length initially increases as the distance from a blade root 130 increases, until reaching a maximum chord length 150, and then decreases towards a tip 140 of the blade.

The outer surfaces of typical modern wind turbine blades, also referred to herein as shells, are composed of an inner skin, an outer skin, and a stabilizing core. Typically, these skins run from the leading edge, or nose, of the blade to the trailing edge, or tail, of the blade, so that the need to cut or join fabrics at an intermediate point is minimized or avoided, simplifying the construction of the blade. For very large blades, fabric of sufficient width to run from the nose to the tail may be difficult to come by, requiring the joining of fabric sections, but such joints are typically minimized. These skins thus typically provide constant mechanical properties, such as the shear modulus of the skin, along their lengths.

Figure 3:
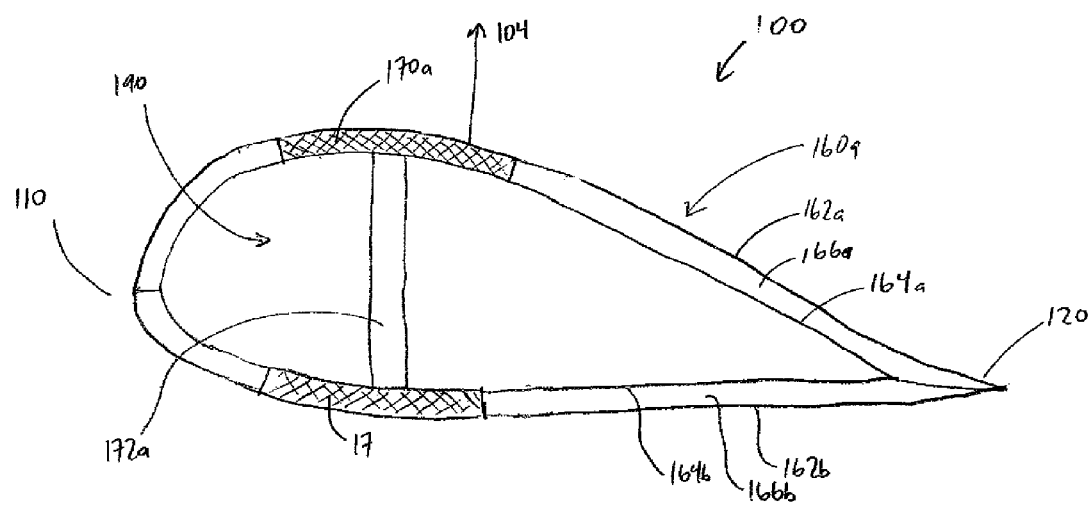
FIG. 3 is a cross-sectional view of the wind turbine blade of FIG. 2.

FIG. 3 is an illustration of an exemplary cross-section of the blade 100 of FIG. 2, taken along the line 3-3 of FIG. 2. The blade 100 comprises an upper shell 160a and a lower shell 160b, and an interior stiffening structure comprising spar caps 170a and 170b and shear web 172 located between the upper and lower shells. As noted above, the shells 160a and 160b are composite structures. In particular, shell 160a comprises an outer skin 162a, an inner skin 164a, and a core 166a located therebetween. The outer and inner skins 162a and 164a may comprise fiberglass or another suitable material in an appropriate thickness. The particular thickness and properties of the outer and inner skins 162a and 164a may vary significantly in various embodiments.

The interior stiffening structure, referred to herein as a spar or main spar, comprises a pair of spar caps 170a and 170b extending adjacent the inner skins 164a and 164b of the upper and lower shells, and extending part of the chord length of the shells, and a shear web 172 extending between the spar caps 170*a* and 170*b*. In the illustrated embodiment, the spar caps 170*a* and 170*b* are disposed between the inner skin and the outer skin of the shells adjacent sections of the core. In such an embodiment, the skins may be formed over the spar caps and the core sections to form shells 160*a* and 160*b*, and the shells may then be assembled to form a blade. In an alternate embodiment, however, the shells may be formed without the spar caps, such that the inner skin is brought into contact with the outer skin, leaving a gap between the core sections where a spar cap can later be placed.

In the illustrated embodiment, a single shear web 172 extends between the spar caps 170*a* and 170*b* to form essentially an I-beam structure. In certain embodiments, some or all of the spar caps 170*a* and 170*b* and shear web 172 comprise a high performance material such as carbon fiber, although these structural members may comprise multiple materials at different locations within the structural members.

Figure 4:
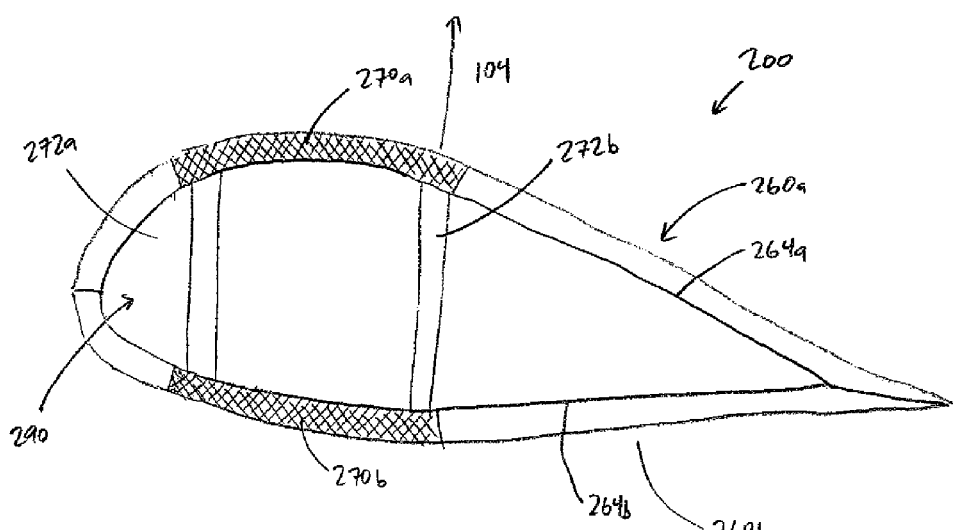
FIG. 4 is cross-sectional view of an alternate wind turbine blade wherein the main spar comprises two shear webs.

In alternate embodiments, turbine blades may comprise more than one shear web extending between the upper and lower spar caps to form a generally box-shaped spar, which may provide additional rigidity, and the embodiments described herein are capable of being used with such a structure. FIG. 4 illustrates an alternate embodiment of a wind turbine blade 200, in which the main spar 290 comprises two spar caps 270*a* and 270*b* extending adjacent inner skins 264*a* and 264*b* of upper and lower shells 260*a* and 260*b*. A first shear web 272*a* extends between the leading edge of upper spar cap 270*a* and the leading edge of lower spar cap 270*b*, and a second shear web 272*b* extends between the trailing edge of upper spar cap 270*a* and the trailing edge of lower spar cap 270*b*. Spar 290 thus has a substantially box-shaped cross-section. In alternate embodiments, the shear webs may extend not from the leading and trailing edges of the spar cap, but may instead extend from locations closer to the center of the spar caps 270*a* and 270*b* at one or more locations along the chordwise width of the spar 290.

A dual shear web spar may provide additional stiffness, while the single shear web illustrated in FIG. 3 above may provide mechanical characteristics, such as lowered torsional resistance, which may be advantageous in certain embodiments such as when the turbine blade utilizes sweep-twist coupling to improve performance.

When installed on a turbine, the turbine blade 100 may be subjected to a variety of loads. Power producing torque, drag forces and gravitational forces may act predominantly within the plane of rotation, subjecting the turbine blade to in-plane bending, also referred to as edgewise bending. This edgewise bending will result in deformation, typically in the direction of rotation, such as in the direction illustrated as 102 in FIG. 2, thereby causing the blade to bend, or sweep, in a forward direction. Power producing torque generally dominates over air drag, and the net effect of gravity will average to zero when the blade is rotating. Resistance to edgewise bending is generally provided by the shell structure of the blade.

The turbine blade may also be subjected to loads acting out of the plane of rotation, such as the force of wind acting on the facing surface of the blade, as well as the lift generated by air flow past the blade. These forces will result in flapwise bending of the turbine blade out of the plane of rotation, such as in direction 104 of FIG. 3. Resistance to flapwise bending is generally provided by the beam structure formed by the shear web 172 and spar caps 170*a,b*. although some shear is carried by the nose and trailing edge paths.

Under operation, the blade may subjected to a load that may be approximated as an inverse triangle load, with zero thrust at the blade root, and maximum thrust at the tip. The aerodynamic efficiency of the blade can be improved by making the blade thinner at portions of the blade outboard of the root, as the linear velocity that the outboard sections travel at is greater than that of the sections closer to the root. Making the airfoil thinner, however, may reduce both the strength and stiffness of the blade, both because the size of the spar is reduced, affecting the moment of inertia of the spar, and because the space for material in the spar cap may be reduced as the blade size is reduced.

The portion of the blade which sees the highest strain will vary depending on the loading conditions and the particular design of the blade, however the highest strains typically occur under load at a section of the blade in the region of approximately ⅔ span to ¾ span. Because this region of maximum strain is typically located a significant distance away from the blade root, additional weight in this region will have a significant effect on the performance of the blade. In contrast, while the loads in the blade sections near the root may be very high, the thickness of the material may be increased to compensate, and the addition of weight in the portions of the blade adjacent the root will not have as much of an effect on the mechanical properties of the blade.

FIG. 5 depicts a side view of an exemplary spar 390, which includes an upper spar cap 370*a*, a lower spar cap 370*b*, and a shear web 372 extending between the two. The outer shell of a blade 300 is illustrated in phantom. As can be seen, the thickness of the spar caps 370*a* and 370*b* typically decreases with increasing distance outwardly from the root of the blade along the length of the spar caps, beginning with an initially thick region at the root of the blade, and tapering to a thinner region near the tip of the blade. At the root end of the blade, the spar caps 370*a* and 370*b* may comprise a root buildup 540, in which the thickness of the spar cap increases significantly to allow the root to be secured to a turbine hub via T-bolts or other appropriate securement structures. Because the securement structures may cause regions of stress concentration, the thicker root buildups 540 prevent corresponding strains from increasing beyond desired levels.

At the very tip, the spar caps 370*a* and 370*b* may terminate before the end of the blade, leaving only the blade shell to provide the requisite stiffness at the tip of the blade. Such a configuration may be possible because the strain may decrease significantly near the tip of the blade, and the shell may provide sufficient stiffness to resist mechanical failure at the tip. It can also be seen that the outer surfaces of the spar caps 370*a* and 370*b*, which run substantially parallel to the outer surfaces of the blade shell due to a minimal variation in the thickness of the blade shell over the length of the blade, taper in a generally linear fashion towards the tip in the illustrated embodiment. The interior surfaces of the spar caps may also taper in a generally linear fashion in some embodiments, but may also follow a curved or otherwise non-linear path, as shown. Because the shape of the interior facing surfaces of the spar caps does not determine the shape of the blade outer surface, the thickness may taper in a non-linear fashion to provide a desired amount of stiffness at each location along the spar 390 without altering the aerodynamic profile of the blade.

In certain embodiments, the spar caps may be made from a single material over the length of the spar cap. In particular embodiments, the spar caps may comprise a material such as fiberglass, which has a stiffness or strength to weight ratio which may require additional material to be included in outboard regions to provide the desired strength. In other embodiments, a material having a higher stiffness or strength ratio may be used, and the spar caps may be made correspondingly thinner, reducing the weight and thickness of the outboard sections of the airfoil. Examples of materials having a higher strength to weight and stiffness to weight ratios than fiberglass include carbon fiber, s-glass, and wood/epoxy/carbon. The term premium materials is utilized herein to refer to materials which may have desirable mechanical properties, such as increased stiffness, strength, or stiffness-to-weight or strength-to-weight ratios.

The use of premium materials having a higher stiffness to weight or strength to weight ratio may increase the cost of production of such a blade. This increase may occur because certain materials which may have more desirable mechanical properties may be more expensive. In addition, these materials may be more difficult to utilize because of additional complexity in the manufacturing process and the experience required to work with these materials. Because of this increase in cost which may be incurred in utilizing premium materials, the benefits from using such a material as the sole or primary material in the spar caps may be outweighed by the cost, for multiple reasons.

For example, the use of premium material to provide a thick spar cap in the inboard section of the blade near the root will allow for a reduction in weight of the overall blade. As noted above, however, additional weight in inboard sections near the root of the blade will affect the mechanical performance of the blade much less than additional weight located further outboard, while the amount of premium material required to form the thicker spar cap sections may be very expensive. In addition, premium material is frequently provided in the form of flat sheets, or plies, and the formation of a section having significant variations in thickness may require the cutting of multiple plies to form the desired shape.

Because the critical region where optimization of stiffness to weight or strength to weight ratios lies in outboard sections of the blade, certain embodiments of blades may comprise spar caps which utilize fiberglass or another comparatively inexpensive and/or heavy material in the inboard sections, and carbon fiber or another premium material in outboard sections. However, such an embodiment will require an interface between different materials along the length of the spar cap. Such interfaces typically introduce ply drops of both the root and the premium material, and the performance of certain premium materials such as carbon fiber can be significantly affected due to ply drops, particularly when the fibers are in compression, rather than tension. These ply drops are also a potential point of failure due to fatigue.

FIG. 6 illustrates an alternate spar 490 which includes both a premium material and another material, and which does so in a manner which optimizes the use of the premium material. Spar 490 includes an upper spar cap 470a which includes an outer section 492a formed of a premium material, and an inner section 494a formed of another material. In certain embodiments, the outer section 492a may comprise carbon fiber, and the inner section 492b may comprise fiberglass, although a wide variety of alternate materials may also be used. The thickness of the outer section 492a remains substantially constant over a constant thickness section 510 of the outer section 492a, which may extend from the root or a position near the root to an outboard section of the blade beyond the point at which the blade is subjected to a peak strain. In certain embodiments, the constant thickness section 510 may extend more than roughly 66% of the length of the blade, in further embodiments more than 75% of the length of the blade, and in still further embodiments more than 80%, 85%, or 90% of the blade length. The thickness of the inner portion 494a is greatest near the blade root, and decreases in outboard sections of the blade. In the illustrated embodiment, the inner portion 494a terminates prior to the termination of the outer section 492a, such that sections of the spar cap in the outer regions of the spar cap 470a are composed primarily or entirely of the premium material, in addition to whatever binders or adhesives are used to construct the spar cap.

This constant thickness section 510 of the outer section 492a of the spar cap 470a includes plies of premium material which extend all or substantially all of the length of the section. Because section 510 of outer section 492a has a substantially constant thickness, all or the bulk of this section may be formed by plies of premium material extending all or substantially all of the length of section 510. By avoiding ply drops, the performance of the outer section 492a can be optimized for a given amount of premium fiber, as the outer section 492 will particularly perform better in tension, compression, and fatigue. The fact that only part of the spar cap is premium material, and of reduced thickness, makes it easier to exert higher quality control during its fabrication, thereby further improving its overall performance. In other embodiments, the premium material section of the spar cap may be made in a separate molding operation to further maximize manufacturing benefits. The placement of the premium material on the outermost part of the spar cap, as discussed above, places it as far as possible from the flapwise neutral bending plane, maximizing the strength and stiffness conferred by this portion of the spar cap. However, significant benefits may still be realized if the premium material section is located inward of some or all of the other material within the spar cap.

Because section 510 extends beyond a point in the blade at which the peak strain occurs, the premium material provides the additional stiffness required in the thinner outer sections of the blade while minimizing the increase in weight. Better blade mechanical performance is thus provided due to the lighter weight of the outboard blade sections. The additional material in the inner section 494a provides desired additional strength and stiffness, and the additional weight added due to the use of the additional material will not have as much of an effect on blade performance as if the weight was added in outboard sections.

The outer section 492a of spar 490 may include an outer section 520, at which the thickness of the spar cap is reduced, by dropping plies. This may be accomplished by dropping plies beginning with either the outermost or innermost plies, but could also be accomplished by dropping plies in the interior of the outer section 492a. The blade 400, the outer shell of which is illustrated in phantom, may extend beyond the spar 490, so that a tip section 530 of the blade does not include an interior support member such as spar 490.

Spar 490 also includes a shear web 472, as well as a lower spar cap 470b, which in the illustrated embodiment includes a structure substantially corresponding to that of upper spar cap 470a. In the particular embodiment illustrated in FIG. 6, the outer section 492b of lower spar cap 470b is substantially the same thickness as that of the outer section 492a of upper spar cap 470a, and the interior section 494b of lower spar cap 470b has substantially the same shape as that of the inner section 494a of upper spar cap 470a.

FIG. 7 is a top view of the spar 490 of FIG. 6. It can be seen that the upper spar cap 470a in the illustrated embodiment comprises a section 550 of substantially constant width, and a section 560 near the outer half of the blade where the width of the upper spar cap tapers inwardly. The upper section 492a of the spar cap 470a may thus comprise a constant width section over a large portion of the length of the upper section 492a. In certain embodiments, the constant width section may extend to a point between at least 50% and 75% of the blade length from the root, and in a particular embodiment, may extend to a point roughly 65% of the blade length from the root. The use of a constant width spar cap may provide advantages in cost by reducing cutting and material handling, and a constantly tapering section of premium material can reduce throw away waste for a given amount of premium material. In the illustrated embodiment, the inner section 494a (not shown in FIG. 7) of the upper spar cap 470a does not extend beyond the edges of the outer section of the upper spar cap, but in other embodiments (not shown) the overall width of the spar cap may be increased near the root by widening the inner portion of the upper spar cap. In such an embodiment, the inner portion of the spar cap may extend beyond the sides of the outer portion of the spar cap, and may thus be brought into direct contact with the upper blade shell along the sides of the upper portion of the spar cap.

In other embodiments, the upper spar cap 470a and the lower spar cap 470b may not be symmetrical. In some embodiments, the thickness and/or shapes of either or both of the inner and outer sections of the upper and lower spar caps may vary, depending on the expected loading. For example, an embodiment of a spar may include an upper spar cap having an outer section of premium fabric which is thicker than an outer section of premium fabric in the lower spar cap, or the lower spar cap may not include premium fabric at all. In other embodiments, the section of constant thickness of the premium fabric in the upper spar cap may be longer or shorter than the section of constant thickness of the premium fabric in the lower spar cap.

In other embodiments, the relative placement of the premium fabric sections and the other material in the spar caps may be modified. In some embodiments, the premium fabric may be located on the interior of all or a portion of the other material, such that the premium fabric is separated from the blade shell by a layer of the other material. For example, in certain embodiments, particularly ones in which the premium material component is formed separately from the remainder of the spar cap or blade shell, one or more layers of fiberglass or similar material may be provided between the blade shell and the premium material component. This layer or layers of other material may provide a structurally active bedding between the premium material component and the blade skin to facilitate securement of the premium material component relative to the remainder of the blade shell. This layer or layers may also provide additional protection for the premium material in the case of a surface impact. In certain embodiments, a significant portion or all of the other material in the spar cap may be located between the premium material component and the blade shell. In such an embodiment, the premium material components may be adjacent or even in contact with the edges of the spar web(s).

Furthermore, although the above descriptions of embodiments of premium material components have discussed a section of substantially constant thickness, the inclusion of some ply drops of premium material adjacent or within the substantially constant thickness section of the premium material component is contemplated and within the scope of the embodiments discussed above. The benefits realized by the inclusion of plies of premium material which extend the length of a section of the spar cap will not be negated by the inclusion of additional plies of premium material or regions of other material which do not extend the entire length of this section, even if those additional plies or material regions are disposed between plies of premium material extending the entire length of such a section. It will thus be understood that some variation in the thickness of the premium material component may be tolerated due to the inclusion of such layers or ply drops.

In other embodiments, although the plies of premium material are described in certain embodiments above as beginning at a section near the blade root, the actual distance between the very root of the blade and the beginning of the premium material sections may vary depending on the design of a given blade. In particular, the root buildup is generally substantially thicker than the spar caps outward of the root buildup, and this thickness may allow for the joining of premium material to other material without substantially affecting the blade performance due to the added weight of material required for this joining. In other embodiments, thicker sections beyond the root buildup may also be tolerated and used to join premium and other material, further increasing the distance between the root of the blade and the beginning of the premium material.

Various combinations of the above embodiments and methods discussed above are contemplated. It is also to be recognized that, depending on the embodiment, the acts or events of any methods described herein can be performed in other sequences, may be added, merged, or left out altogether (e.g., not all acts or events are necessary for the practice of the methods), unless the text specifically and clearly states otherwise.

While the above detailed description has shown, described, and pointed out novel features as applied to various embodiments, various omissions, substitutions, and changes in the form and details of the device of process illustrated may be made. Some forms that do not provide all of the features and benefits set forth herein may be made, and some features may be used or practiced separately from others.

What is claimed is:

1. A wind turbine blade, comprising:
a blade shell; and a main spar located at least partially within the blade shell, the main spar comprising a first spar cap, a second spar cap, and at least one shear web extending between the first spar cap and the second spar cap, wherein the first spar cap comprises:
a first outer component comprising a first material, wherein the first outer component has a substantially constant thickness over a section of the length of the spar cap which extends along at least half the length of the blade shell; and
a second inner component located inward of the first component and comprising a second material wherein the second material is different from the first material and varies in thickness going along the length of the second material.

2. The bade of claim 1 wherein the section of substantially constant thickness of the first component comprises a plurality of plies of said first material extending along the length of the said section of substantially constant thickness.

3. The blade of claim 1 wherein the first material has a strength to weight ratio greater than the strength to weight ratio of the second material.

4. The blade of claim 1, wherein the first material has a stiffness to weight ratio greater than a stiffness to weight ratio of the second material.

5. The blade of claim 1 wherein the first component of the first spar cap extends along an inner surface of the blade shell, and wherein the first component is disposed between at least a part of the second component of the first spar cap and said inner surface of the blade shell.

6. The blade of claim 5 wherein said at least part of the second component of the first spar cap is disposed between the first component of the first spar cap and said inner surface of the blade shell.

7. The blade of claim 1 wherein the first material comprises carbon fiber.

8. The blade of claim 1 wherein the second material comprises fiberglass.

9. The blade of claim 1, wherein an outboard end of the first component of the spar cap is located outboard of an outboard end of the second component of the first spar cap.

10. A wind turbine blade, comprising:
a blade shell; and
a main spar located at least partially within the blade shell, the main spar comprising a first spar cap, a second spar cap, and at least one shear web extending between the first spar cap and the second spar cap, wherein the first spar cap comprises a first component comprising a first material and a second component comprising a second material, the second material being different than the first material, wherein the first component comprises a plurality of plies of said first material extending at least between a first point in an inboard region of the blade and a second point located more than 50% of the blade length away from the first point.

11. The wind turbine blade of claim 10, wherein the first point is located near the blade root.

12. The wind turbine blade of claim 10, wherein the first point is located within a root buildup section of the blade.

13. A spar, comprising:
a first spar cap, wherein the first spar cap comprises a first component comprising a constant thickness section having a substantially constant thickness of a first material, and a second component having thickness which varies over the length of the second component, wherein the length of the substantially constant thickness section of the first component is greater than the length of the second component;
a second spar cap; and
at least one shear web extending between an inner surface of the first spar cap and an inner surface of the second spar cap.

14. The spar of claim 13, wherein the second spar cap comprises a first component comprising a constant thickness section having a substantially constant thickness of a first material, and a second component having thickness which varies over the length of the second component, wherein the length of the substantially constant thickness section of the first component is greater than the length of the second component.

15. The spar of claim 14, wherein the constant thickness section of the first component of the first spar cap has a thickness which is substantially equal to a thickness of the constant thickness section of the first component of the second spar cap.

16. The spar of claim 13, wherein the first component of the first spar cap comprises a tapering section located outboard of the constant thickness section.

17. The spar of claim 13, wherein the first component of the first spar cap comprises a section of substantially constant width.

18. The spar of claim 13, wherein the constant thickness section of the first component of the first spar cap extends at least 66% of the length of the first component.

19. The spar of claim 13, wherein the constant thickness section of the first component of the first spar cap extends at least 80% of length of the first component.

* * * * *